Jan. 17, 1967          A. B. HARDING          3,298,856

METHODS OF FINISHING LEATHER, AND PRODUCTS THEREBY OBTAINED

Filed Feb. 12, 1965

Inventor:
Archibald B. Harding,
by Kern & Folkers
Attorney

3,298,856
METHODS OF FINISHING LEATHER, AND PRODUCTS THEREBY OBTAINED

Archibald B. Harding, Exeter, N.H., assignor to Miljo Chemical Company, Incorporated, Exeter, N.H., a corporation of New Hampshire
Filed Feb. 12, 1965, Ser. No. 432,421
7 Claims. (Cl. 117—76)

The present application is a continuation-in-part of application Serial No. 189,598, filed April 23, 1962, now abandoned.

This invention relates to the finishing of leather, and more particularly to the treatment of leather with finishes of the polyurethane elastomer type and to the finished leathers thereby obtained.

It is a primary object of the invention to provide finished leathers of the type known as "patent leather," in which the finish is greatly improved from the standpoint of toughness, flexing, cold cracking and ability to stretch beyond the stretch limit of the base leather.

It is a further object of the invention to provide a primer or sealer coating on the leather which preserves the natural appearance of the hair follicles in the leather while at the same time covering the gross imperfections, and which shows good adhesion with the leather and with top coats, and particularly with varnish top coats having a polyurethane base.

A further understanding of the invention will be obtained from the following more detailed description and from the accompanying drawings, in which—

Figure 1:
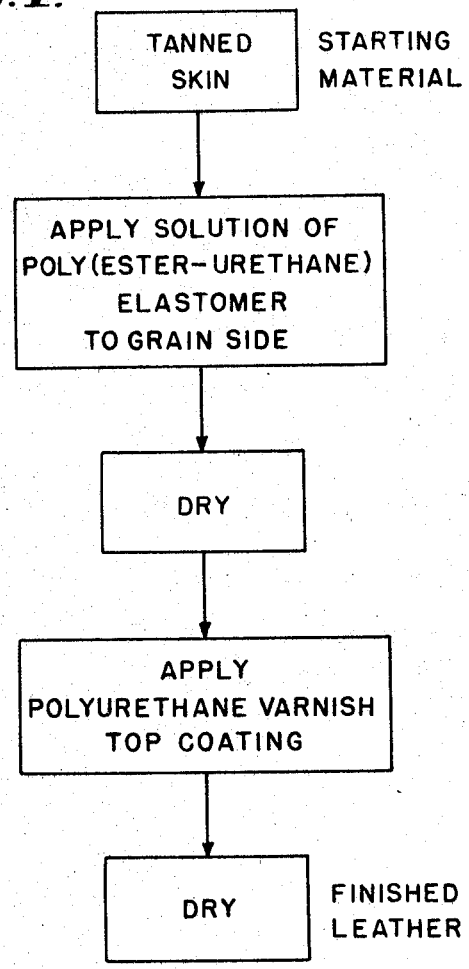
FIGURE 1 represents a flow sheet of a preferred process.
Figure 2:
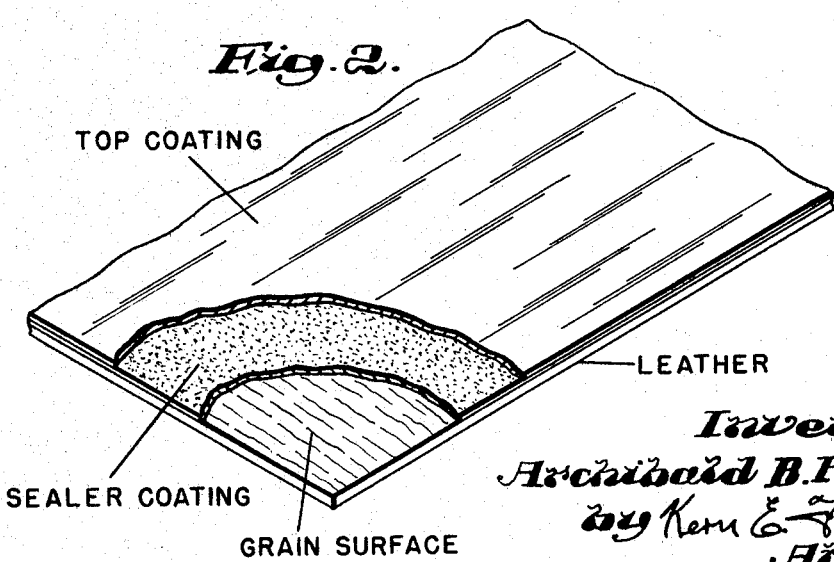
FIGURE 2 is a view in perspective of the finished leather, partly broken away to show the several layers.

The above objects are in general obtained by first treating a properly tanned leather on the grain side thereof with a substantially non-penetrating sealer coat or film having a poly (ester-urethane) elastomer as the chief solid constituent, and then applying a finish coat or coats in the usual manner. The sealer coat is applied in the form of a solution in suitable solvents, such as methyl ethyl ketone, either with or without a diluent, such as toluene. The poly (ester-urethane) elastomers employed in the above manner are substantially free of crosslinks, but have all the advantageous properties of crosslinked polyurethanes, such as high resistance to abrasion and wear, and since they are thermoplastic in nature they need not be crosslinked or cured and can be processed by standard solution techniques.

Suitable materials for use in the preparation of the sealer coatings are certain poly(ester-urethane) elastomers made and sold by the B. F. Goodrich Company of New York, New York, under the trademark "Estane." In general, the elastomers referred to are the reaction products of essentially linear hydroxyl terminated polyesters with certain aromatic diisocyanates and either straight chain or alkoxy diols. Such products and methods of making them are further described in Patent No. 2,871,218 graned January 27, 1959, to Charles S. Schollenberger and in Patent No. 3,001,971, granted September 26, 1961, to Harvey Scott and Glenn R. Moore.

The elastomers of the type referred to above are completely reacted, uncured and normally non-curing. Moreover, they are not only free of cross-links, but of unreacted aromatic diisocyanate.

A suitable method for finishing leather in accordance with this invention comprises first applying the solution of the poly(ester-urethane) elastomer directly to the grain side of a tanned skin, then drying the coated skin to remove the solvent, applying a top coat, such as a polyurethane top coat, and again drying the coated skin until the desired finished appearance is obtained. If desired, the elastomer solution forming the sealer coating may be compounded with various pigments, dyes, and other decorative materials, including metallics, such as aluminum and bronze powders, pearly pigments and glitters, which add color and sparkle to the finishes.

A wide variety of leather finishes can be applied advantageously over the above described elastomer base coats. For example, excellent leathers have been produced using nitrocellulose lacquers and lacquer emulsion top coats over these base coats. However, the highest quality patent leathers are obtained by using polyurethane top coats, such as for example the polyurethane varnish top coat which consists of a two pot system in which a polyol-isocyanate prepolymer is mixed with a polyol before application to the leather.

While some of the elastomers used in the preparation of the sealer coatings can be readily dissolved in methyl ethyl ketone, either with or without a diluent, others require more strongly solvating solvents, such as tetrahydrofuran, dioxane, cyclohexanone, and dimethyl formamide. In view of this, it is sometimes advantageous to apply the elastomer solution to the leather by curtain coating or flow coating methods. This is especially true when webbing takes place during spraying, as in those instances where a low solids content is obtained at spraying viscosities. When applying the top coats, however, it is usually possible to use spraying, brushing, or any conventional method, although curtain coating can also be employed, if desired.

Examples of suitable solutions for use as a sealer coating on leather are as follows, the figures representing percents by weight:

Example I

| | |
|---|---|
| Poly(ester-urethane) elastomer | 16 |
| Carbon black | 4 |
| Methyl ethyl ketone | 60 |
| Toluene | 20 |

The elastomer of the above example is the reaction product of adipic acid, ethylene glycol and p-phenylene diisocyanate.

Example II

| | |
|---|---|
| Poly(ester-urethane) elastomer | 16 |
| Titanium dioxide | 4 |
| Dimethyl formamide | 80 |

The elastomer of Example II is the reaction product of adipic acid, butane diol-1, 4 and diphenyl methane-p,p'-diisocyanate.

Example III

| | |
|---|---|
| Poly(ester-urethane) elastomer | 10 |
| Carbon black | 4 |
| Dimethyl formamide | 60 |
| Toluene | 26 |

The elastomer of Example III is a mixture in about equal amounts of the reaction products described in Examples I and II.

The elastomers suitable for use in the leather finishing solutions of this invention are prepared in accordance with the procedures described in the above mentioned patent.s As mentioned therein, it is important that the ratio of reactants employed be balanced so that the poly-(ester-urethane) elastomer obtained as the end reaction product is substantially free of excess or unreacted diisocyanate, glycol or hydroxyl groups.

On applying the above solutions to the grain side of the leather and drying, excellent sealer coatings were formed, which adhered well, yet penetrated the leather very little. Their film properties and drying characteristics were also excellent, and they showed very good tensile strength, elongation and adhesion to leather. On applying polyurethane top coats thereto, tough and abrasion resistant leathers suitable for use in the manufacture of patent leather articles were obtained.

What I claim is:

1. The method of finishing leather which comprises applying directly to the grain side of a previously tanned skin a substantially non-penetrating surface coating comprising a solution in an organic solvent of a completely reacted, thermoplastic, uncured and normally non-curing poly(ester-urethane) elastomer which is cross-link free and substantially free of unreacted aromatic diisocyanate, and then drying said coating to remove the solvent therefrom, whereby a substantially dry outer layer on said leather is obtained, which retains the thermoplasticity and solubility of the original elastomer.

2. The method substantially as described in claim 1, but further characterized in that a top coating is applied on said coated leather and then dried to provide a patent leather finish said top coating being selected from the group consisting of nitrocellulose lacquers and lacquer emulsions and polyurethane varnish coatings.

3. The method substantially as described in claim 2, but further characterized in that a pigment is incorporated in the first applied coating prior to drying the same.

4. The method substantially as described in claim 2, but further characterized in that said top coating is a polyurethane varnish coating.

5. Leather having on the grain side thereof a tough, flexible surface coating of a completely reacted, thermoplastic, uncured and normally non-curing poly(ester-urethane) elastomer which is cross-link free and substantially free of unreacted diisocyanate, said leather being substantially free of penetration by said coating.

6. Leather having on the grain side thereof a sealer coating comprising a completely reacted, thermoplastic, uncured and normally non-curing poly(ester-urethane) elastomer which is cross-link free and substantially free of unreacted diisocyanate, said sealer coating being essentially a non-penetrating surface coating which is soluble in organic solvents and having applied thereover an adherent finish coating said finish coating being selected from the group consisting of nitrocellulose lacquers and lacquer emulsions and polyurethane varnish coatings.

7. Patent leather having on the grain side thereof a sealer coating comprising a completely reacted, thermoplastic, uncured and normally non-curing poly(ester-urethane) elastomer which is cross-link free and substantially free of unreacted diisocyanate, said sealer coating being essentially a non-penetrating surface coating which is soluble in organic solvents and having applied thereover an adherent finish layer comprising a polyurethane varnish coating.

References Cited by the Examiner

UNITED STATES PATENTS

| 2,201,892 | 5/1940 | Edgar et al. | 117—76 |
| 2,828,220 | 5/1958 | McWherter et al. | 117—142 |
| 2,828,223 | 5/1958 | McWherter et al. | 117—142 |
| 2,976,182 | 3/1961 | Caldwell et al. | 117—142 |
| 3,001,971 | 9/1961 | Scott et al. | 260—75 |
| 3,016,876 | 1/1962 | Sedlacsik | 117—142 |
| 3,027,276 | 3/1962 | Cohen et al. | 117—142 |
| 3,047,526 | 7/1962 | Stephens et al. | 117—142 |
| 3,066,997 | 12/1962 | Neher et al. | 117—142 |

FOREIGN PATENTS

| 815,185 | 6/1959 | Great Britain. |
| 126,471 | 1960 | Russia. |

ALFRED L. LEAVITT, *Primary Examiner.*

MURRAY KATZ, *Examiner.*

A. ROSENSTEIN, *Assistant Examiner.*